US006941640B2

(12) United States Patent
Neal et al.

(10) Patent No.: US 6,941,640 B2
(45) Date of Patent: Sep. 13, 2005

(54) METHOD OF MANUFACTURING A BASE PLATE FOR A MINIATURE HARD DISC DRIVE

(75) Inventors: Griffith D. Neal, Alameda, CA (US); Dennis K. Lieu, Moraga, CA (US)

(73) Assignee: Encap Motor Corporation, Alameda, CA (US)

( * ) Notice: Subject to any disclaimer, the term of this patent is extended or adjusted under 35 U.S.C. 154(b) by 245 days.

(21) Appl. No.: 10/001,692

(22) Filed: Oct. 25, 2001

(65) Prior Publication Data

US 2003/0081347 A1 May 1, 2003

(51) Int. Cl.[7] .......................... G11B 5/127; H04R 31/00
(52) U.S. Cl. ...................... 29/603.03; 29/829; 29/830; 29/831; 29/854; 29/855; 29/856; 29/858; 198/867.01; 264/171.14; 264/297; 264/328.2; 264/328.8; 264/328.18; 264/251; 264/254; 425/122
(58) Field of Search ................... 29/603.03, 829–832, 29/835, 841, 854, 855, 856, 858, 888; 198/867.01; 264/171.14, 297, 297.1, 297.2, 328.2, 328.8, 251, 254; 425/122

(56) References Cited

U.S. PATENT DOCUMENTS

| | | | |
|---|---|---|---|
| 4,075,395 A | | 2/1978 | Ohnishi |
| 4,202,091 A | | 5/1980 | Ohnishi |
| 4,813,194 A | | 3/1989 | Dobyns et al. |
| 5,414,574 A | | 5/1995 | Boutaghou et al. |
| 5,650,896 A | * | 7/1997 | Viskochil ................. 360/265.7 |
| 5,966,799 A | * | 10/1999 | Understiller et al. .......... 29/600 |
| 6,023,392 A | | 2/2000 | Kim |
| 6,034,841 A | | 3/2000 | Albrecht et al. |
| 6,278,574 B1 | | 8/2001 | Wakita et al. |
| 6,300,695 B1 | | 10/2001 | Neal |
| 6,362,554 B1 | | 3/2002 | Neal |
| 6,426,847 B1 | * | 7/2002 | Dague et al. ............. 360/97.01 |
| 6,437,464 B1 | | 8/2002 | Neal |
| 6,496,326 B1 | | 12/2002 | Boutaghou |
| 6,501,616 B1 | | 12/2002 | Neal |
| 6,617,721 B1 | | 9/2003 | Neal |
| 2001/0045782 A1 | | 11/2001 | Lieu et al. |
| 2002/0070614 A1 | | 6/2002 | Rehm et al. |
| 2002/0135263 A1 | | 9/2002 | Neal |
| 2003/0071382 A1 | | 4/2003 | Neal |
| 2003/0218827 A1 | | 11/2003 | Teo et al. |
| 2004/0034988 A1 | | 2/2004 | Neal |

FOREIGN PATENT DOCUMENTS

JP      59215843 A   * 12/1984   ............. B29F/1/10

OTHER PUBLICATIONS

"A PZT micro-actuated suspension for high TPI hard disk servo systems"; Yimin Niu; Wei Guo; Guoxiao Guo; Eng Hong Ong; Sivadasan, K.K.; Huang, T.; Magnetics, IEEE Transactions on , vol.: 36 , Issue: 5 , Sep. 2000; pp. :2241–2243.*

* cited by examiner

*Primary Examiner*—A. Dexter Tugbang
*Assistant Examiner*—Paul Kim
(74) *Attorney, Agent, or Firm*—Steven P. Shurtz; Brinks Hofer Gilson & Lione

(57) ABSTRACT

The present invention is directed to a miniature hard disc drive having a metal base plate, an actuator assembly wherein the actuator assembly comprises a plurality of bearings, a shaft, and a housing; a spindle motor assembly comprising a stator with conductors, a shaft, a plurality of bearings, and a rotor; and a monolithic body of phase change material unitizing said actuator assembly housing and stator to the base plate. Methods of developing and constructing the hard disc drive are also disclosed.

22 Claims, 4 Drawing Sheets

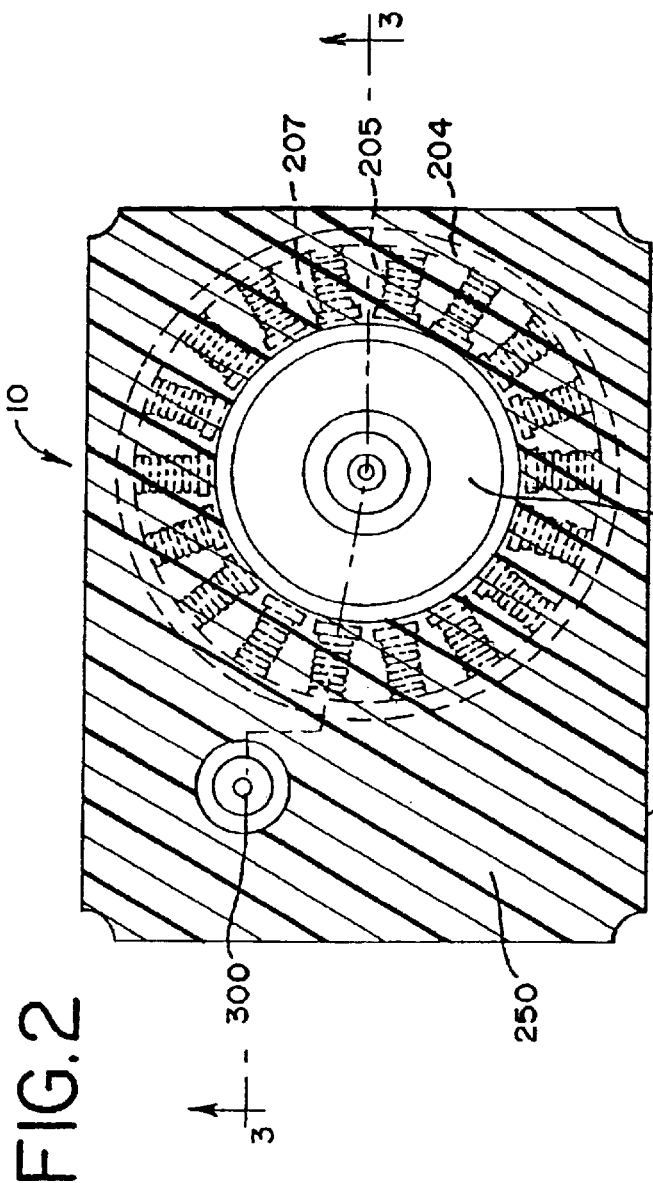
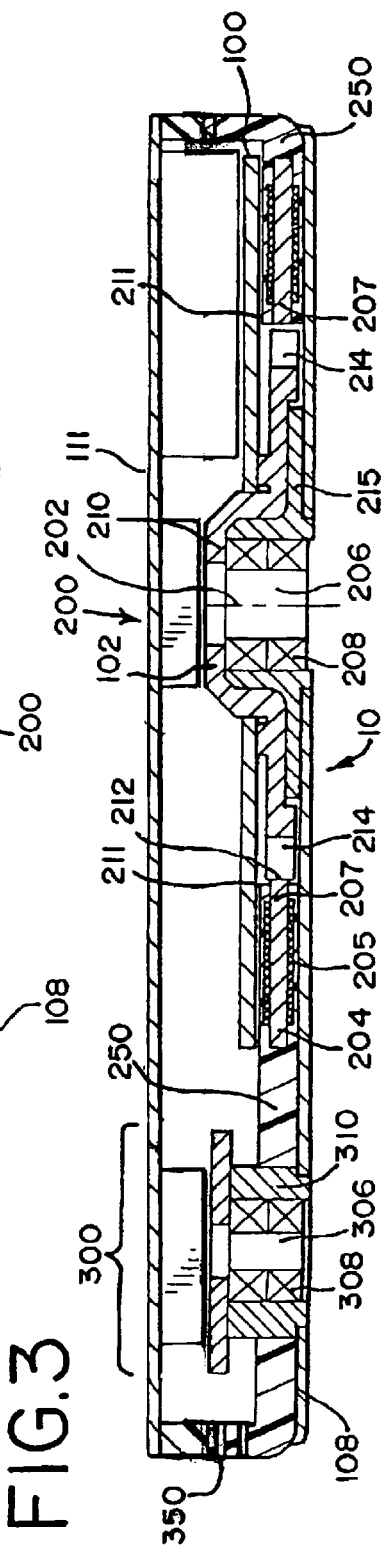
FIG.2
FIG.3

METHOD OF MANUFACTURING A BASE PLATE FOR A MINIATURE HARD DISC DRIVE

FIELD OF THE INVENTION

The present invention relates generally to a hard disc drive. It relates particularly to a miniature hard disc drive that uses a high speed spindle motor assembly, an actuator assembly and to the construction and arrangement of the spindle motor assembly and actuator assembly to align and retain the respective component parts of the assemblies, as well as motor and other component assemblies used in the miniature hard disc drive, and methods of manufacturing hard disc drives.

BACKGROUND OF THE INVENTION

Computers commonly use disc drives for memory storage purposes. Disc drives include a stack of one or more magnetic discs that rotate and are accessed using a head or read-write transducer. Miniature hard disc drives are smaller than other hard disc drives and are used in hand-held electronic devices and portable electronic devices such as cellular phones, hand-held personal computers, digital cameras and personal digital assistants (PDA's). Typically, a high-speed motor such as a spindle motor is used to rotate the discs. An example of a miniature hard disc drive is International Business Machines' (IBM) Microdrive™.

An example of a conventional spindle motor 1 used in a hard disc drive is shown in FIG. 1. The motor 1 includes a base 2 which is usually made from die cast aluminum, a stator 4, a shaft 6, bearings 7 and a disc support member 8, also referred to as a hub. A magnet 3 and flux return ring 5 are attached to the disc support member 8. The stator 4 is separated from the base 2 using an insulator (not shown) and attached to the base 2 using a glue. Distinct structures are formed in the base 2 and the disc support member 8 to accommodate the bearings 7. One end of the shaft 6 is inserted into the bearing 7 positioned in the base 2 and the other end of the shaft 6 is placed in the bearing 7 located in the hub 8. A separate electrical connector 9 may also be inserted into the base 2.

Each of these parts must be fixed at predefined tolerances with respect to one another. Accuracy in these tolerances can significantly enhance motor performance.

In operation, the disc stack is placed upon the hub. The stator windings are selectively energized and interact with the permanent magnet to cause a defined rotation of the hub. As hub 8 rotates, the head (not shown) engages in reading or writing activities based upon instructions from the CPU in the computer.

Manufacturers of disc drives are constantly seeking to improve the speed with which data can be accessed. To an extent, this speed depends upon the speed of the spindle motor, as existing magneto-resistive head technology is capable of accessing data at a rate greater than the speed offered by the highest speed spindle motor currently in production. The speed of the spindle motor is dependent upon the dimensional consistency or tolerances between the various components of the motor. Greater dimensional consistency between components leads to a smaller gap between the stator 4 and the magnet 3, producing more force, which provides more torque and enables faster acceleration and higher rotational speeds. One drawback of conventional spindle motors is that a number of separate parts are required to fix motor components to one another. This can lead to stack up tolerances which reduce the overall dimensional consistency between the components. Stack up tolerances refers to the sum of the variation of all the tolerances of all the parts, as well as the overall tolerance that relates to the alignment of the parts relative to one another.

An important characteristic of a hard drive is the amount of information that can be stored on a disc. One method to store more information on a disc is to place data tracks more closely together. Presently this spacing between portions of information is limited due to vibrations occurring during the operation of the motor. These vibrations can be caused when the stator windings are energized, which results in vibrations of a particular frequency. These vibrations also occur from harmonic oscillations in the hub and discs during rotation, caused primarily by non-uniform size media discs.

An important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arhennius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation and the resultant further heat increase, non-uniform rotation requiring greater spacing in data tracks, and reduced bearing life. One drawback with existing motor designs is their limited effective dissipation of the heat, and difficulty in incorporating heat sinks to aid in heat dissipation. In addition, in current motors the operating temperatures generally increase as the size of the motor is decreased.

Manufacturers have established strict requirements on the outgassing of materials that are used inside a hard disc drive. These requirements are intended to reduce the emission of materials onto the magnetic media or heads during the operation of the drive. Of primary concern are glues used to attach components together, varnish used to insulate wire, and epoxy used to protect steel laminations from oxidation.

In addition to such outgassed materials, airborne particulate in a drive may lead to head damage. Also, airborne particulates in the disc drive could interfere with signal transfer between the read/write head and the media. To reduce the effects of potential airborne particulate, hard drives are manufactured to exacting clean room standards and air filters are installed inside of the drive to reduce the contamination levels during operation.

With the rapidly expanding development of personal computers into the field of first what was termed portable, then lap-top, notebook and now hand held size computers and digital cameras, there has been a tremendous demand for smaller disc drives with increased performance for such small computers. Especially important to manufacturers, is the ability to reduce the height of the disc drive so that the size of the casing for the computer could be minimized. It is an objective of the present invention to provide a compact hard disc drive system that is compatible with notebook and hand held computer applications, and can be compatible with devices using Type I and Type II Flash memory devices.

Another objective of the invention is to provide a compact hard disc drive system that has lower vibration and greater structural integrity to provide increased data storage capability and increased speed.

Another example of a spindle motor that can be used in a hard drive is shown in U.S. Pat. No. 5,694,268 (Dunfield et al.) (incorporated herein by reference). Referring to FIGS. 7 and 8 of this patent, a stator 200 of the spindle motor is encapsulated with an overmold 209. The overmolded stator contains openings through which mounting pins 242 may be inserted for attaching the stator 200 to a base. U.S. Pat. No. 5,672,972 (Viskochil) (incorporated herein by reference) also discloses a spindle motor having an overmolded stator. One drawback with the overmold used in these patents is that it has a different coefficient of linear thermal expansion ("CLTE") than the corresponding metal parts to which it is attached. Another drawback with the overmold is that it is not very effective at dissipating heat. Further, the overmolds shown in these patents are not effective in dampening some vibrations generated by energizing the stator windings.

U.S. Pat. No. 5,806,169 (Trago) (incorporated herein by reference) discloses a method of fabricating an injection molded motor assembly. However, the motor disclosed in Trago is a step motor, not a high-speed spindle motor, and would not be used in applications such as hard disc drives. Furthermore, none of these prior art embodiments integrate the base of the hard disc drive, thereby eliminating the cost of the base. Thus, a need exists for an improved miniature hard disc drive that is small and lightweight yet overcomes the aforementioned problems.

BRIEF SUMMARY OF THE INVENTION

A miniature hard disc drive has been invented which overcomes many of the foregoing problems. In addition, unique stator assemblies and other components of a high-speed motor have been invented, as well as methods of manufacturing hard disc drives. In one aspect, the invention is a hard disc drive having an actuator assembly that includes an actuator assembly housing; a spindle motor assembly having a stator with conductors, a rotor, a shaft, and a plurality of bearings; a base plate; and a monolithic body of phase change material substantially encapsulating said actuator assembly housing and said stator to the base plate.

In another aspect, the invention is a miniature hard disc drive having a metal base plate; an actuator assembly wherein the actuator assembly has a plurality of bearings, a shaft, and a housing; a spindle motor assembly having a stator with conductors, a shaft, a plurality of bearings, and a rotor; and a monolithic body of phase change material unitizing said actuator assembly housing stator to the base plate.

In yet another aspect, the invention is a method for making a miniature hard disk drive including the steps of providing a stator having a plurality of poles with wire windings around said poles; providing an actuator assembly housing; providing a base plate; substantially encapsulating the stator, the actuator assembly housing and the base plate with a phase change material so as to form a unitized body; and forming a miniature hard disc drive from said unitized body.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 2 is a top view of a hard disc drive of the present invention with the cover, actuator and read-write head removed, and showing the remaining components encapsulated in the monolithic body with dashed lines.

FIG. 3 is a cross-sectional view of the hard disc drive of FIG. 2 with its cover on, but without the actuator and read-write head, from a vertical cross-sectional view sectioned along line 3—3 of FIG. 2.

DETAILED DESCRIPTION OF THE INVENTION

Figure 1:
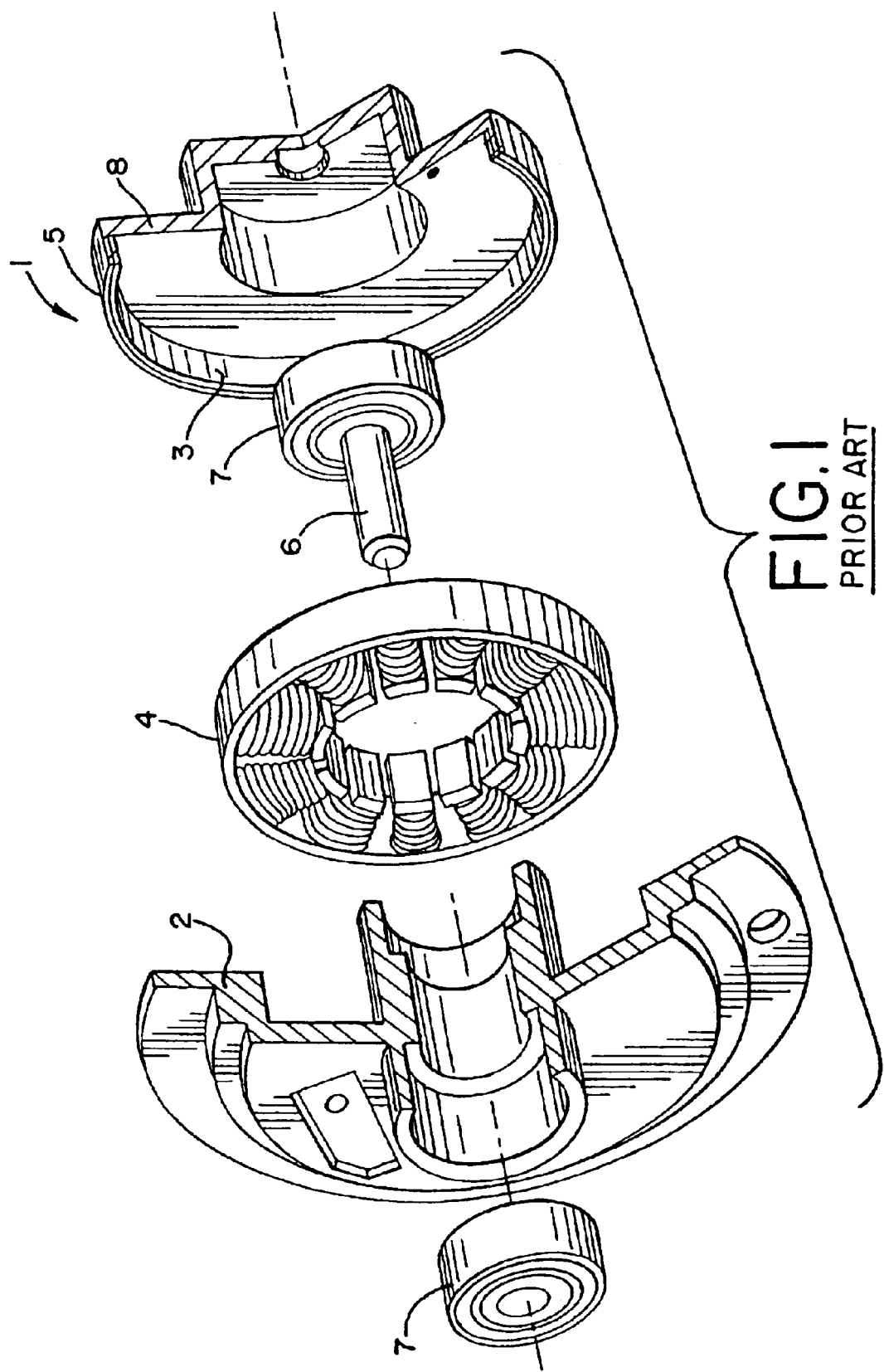
FIG. 1 is an exploded, partial cross-sectional and perspective view of a conventional high-speed motor.

The miniature hard disc drive 10 of the present invention is shown from a top view (with the cover shell removed) in FIG. 2 and in FIG. 3 from a vertical sectional view sectioned along a line through the spindle motor and actuator assembly axes of rotation. In each of the figures like components are designated by like reference numerals.

Referring to FIG. 3, the major elements of the miniature hard disc drive system 10 of the present invention are shown, including hard disc 100, spindle motor assembly 200, and an actuator assembly 300. These components are attached to a base portion 108 of a housing. The base plate 108 is preferably made of stamped steel. A shell portion forms a cover 111, and in conjunction with the base portion 108, encloses the aforementioned disc drive components.

The hard disc 100 preferably has a diameter of about 27 millimeters. The disc 100 has a centrally located aperture through which a hub 102 extends. Each disc 100 is preferably constructed from glass, aluminum, or canestite having a thickness of about 0.38 millimeters and is coated with a magnetic material. Once formatted each disc is capable of having more than 2000 tracks per inch of accessible storage space. This density of tracks enables a miniature disc drive to store more than 20 MB of data in a single disc system. Discs meeting these requirements are available from Yamaha, Fuji Corporation and Hitachi Corporation, all of Japan.

The disc drive explained herein utilizes one or more magnetic coated discs 100; however, the disc drive may utilize various numbers and types of discs. For example, optical discs and associated laser technology based read/write heads could be used and the concepts and principles embodied in this invention would be fulfilled.

The means for rotatably supporting the hard disc 100 is a hub 102 which is an integral part of the rotor 210 of a spindle motor assembly 200. In the preferred embodiment of the present invention and as depicted in FIG. 3, one concentrically aligned disc 100 is positioned on the hub 102. The disc drive depicted is a single disc system; however, to increase storage capability, multi-disc systems are foreseeable.

As depicted in FIG. 3, the means for rotating the hard disc 100 is preferably a spindle motor assembly 200 having an integral hub 102. The spindle motor 200 includes a stator 204, a rotor 210, a shaft 206, and bearing supports 208. The stator 204 has a plurality of poles 207 with wire windings 205. Preferably each pole 207 has about 50 turns of copper wire 205 with an American wire gauge number of 38. The wire windings 205 serve as conductors and induce or otherwise create a plurality of magnetic fields when electrical current is conducted through the conductors. In this embodiment, a magnetic field is induced in each of the poles 207.

In the present embodiment, the integral hub 102 is fixedly mounted to a shaft 206 forming the axis of rotation 202 of the motor 200. The shaft 206 is mounted to the base plate 108 using pins (not shown) or other conventional mounting means. Bearing supports 208 are journalled about the shaft 206 and support a rotor 210 comprised of the hub 102 and a permanent magnet 214 positioned on a outer surface of the hub 102 facing the stator 204. The interaction of a magnetic field generated by the stator 204 with the rotor permanent magnets 214 propels the rotor 210 to spin. The rotor 210, having the hub 102 as an integral component, rotates the hard disc 100. In the preferred embodiment shown in FIG. 3, there is also a base 215 that houses bearing supports 208 and shaft 206. The base 215 is not essential to practice the invention and can be removed, and instead the hub 102 can be used to house the bearing supports 208 and shaft 206.

The actuator assembly 300 has a voice coil motor (not shown) that drives an actuator arm (not shown) to pivot and swing back and forth over the disc surface 100 to read and write data. The actuator assembly arm is attached to a shaft 306 or actuator pivot at one end. The other end of the actuator arm has a head that reads and writes data. The shaft 306 is mounted to the base plate 108 through pins or other conventional mounting means. Bearing supports 308 are journalled about the shaft 306. The bearing supports 308 and shaft 306 are housed in a metal housing 310. The metal housing 310 is preferably made of steel.

Referring to FIGS. 2 and 3, the stator 204 of the spindle motor assembly 200 and the housing 310 of the actuator assembly 300 are unitized with the base plate 108 by encapsulating them with a top surface of base plate 108. Conventionally, the spindle motor assembly and actuator assembly are mounted to the base using conventional mounting features such as connecting pins or glue. In the present embodiment, the stator 204 and the housing 310 of the actuator assembly 300 and a top surface of the base plate 108 are encapsulated with a phase change material to form a unitized, preferably monolithic, body 250. The phase change material used to make the body 250 is preferably a thermally conductive but non-electrically conductive plastic. In addition, the plastic preferably includes ceramic filler particles of either boron nitride or preferably aluminum nitride. The coefficient of linear thermal expansion ("CLTE") of the plastic is preferably between the CLTE of steel and the CLTE of aluminum over the operating temperature range of the hard disc drive. A preferred form of plastic is polyphenyl sulfide (PPS) sold under the trade name "Konduit" by LNP Engineering Plastics. Grade OTF-212-11 is particularly preferred. Examples of other suitable thermoplastic resins include, but are not limited to, thermoplastic resins such as 6,6-polyamide, 6-polyamide, 4,6 polyamide, 12,12-polyamide, and polyamides containing aromatic monomers, polybutylene terephthalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenyloxide, polystyrene, styrene copolymer, mixterus and graft copolymers of styrene and rubber, and glass reinforced or impact modified versions of such resins. Blends of these resins such as polyphenylene oxide and polyamide blends, and polycarbonate and polybutylene terephthalate, may also be used in the invention.

As illustrated in FIGS. 2 and 3, the body 250 encapsulates a substantial area of a top surface of the base plate 108, stator 204, and the external surface of actuator assembly housing 310. After encapsulation, the actuator assembly housing 310 and the stator 204 are unitized with base plate 108. The body 250 extends over the top surface of stator 204 and preferably terminates around the inner edge 211 of stator 204. The inner side surface 212 of stator 204 is preferably left un-encapsulated to obtain the smallest distance between the conductors and permanent magnet 214. The inner side surface 212 may be encapsulated with a thin layer of phase change material without deviating from the scope of the present invention. The thickness of the body 250 may vary but is preferably at least about 0.2 millimeters. The critical thickness required is that the body 250 must be thick enough so that it extends over the top surface of stator 204. Preferably, for greater structural integrity the body 250 may be thicker around the edge of the base plate 108.

Figure 4:
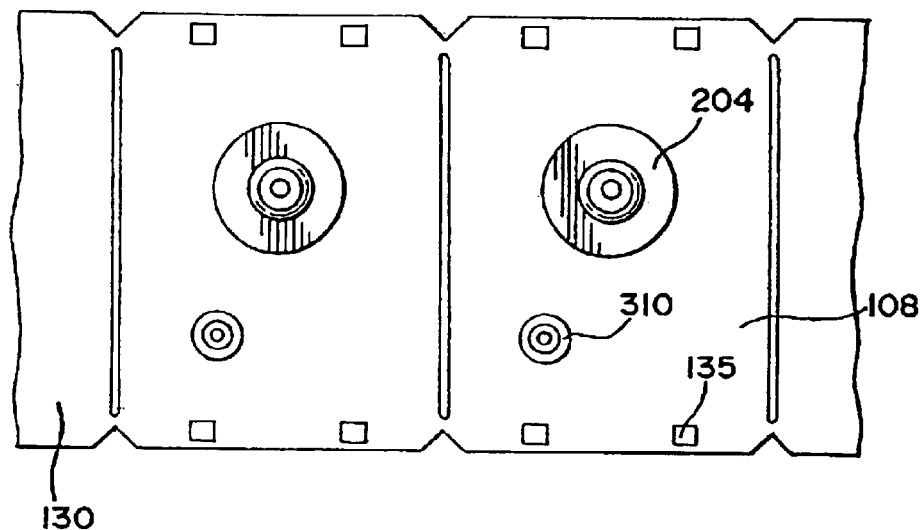
FIG. 4 is a top view of a metal strip after being through the injection molding process.

The hard drive shown in FIGS. 2 and 3 is made in part using an encapsulation technique. This encapsulation technique involves the following steps, and uses an injection mold. First, a mold is constructed to produce a part with desired geometry. The mold has two halves or cavities. In a preferred embodiment, the base plates are stamped into a continuous strip of metal which is fed through the mold. As shown in FIG. 4, the strip 130 creates multiple plates 108. In alternative embodiments, the base plates 108 can be placed side by side for multicavity molding, or as is shown in FIG. 6 the cover can be fabricated on the same strip of metal.

Figure 6:
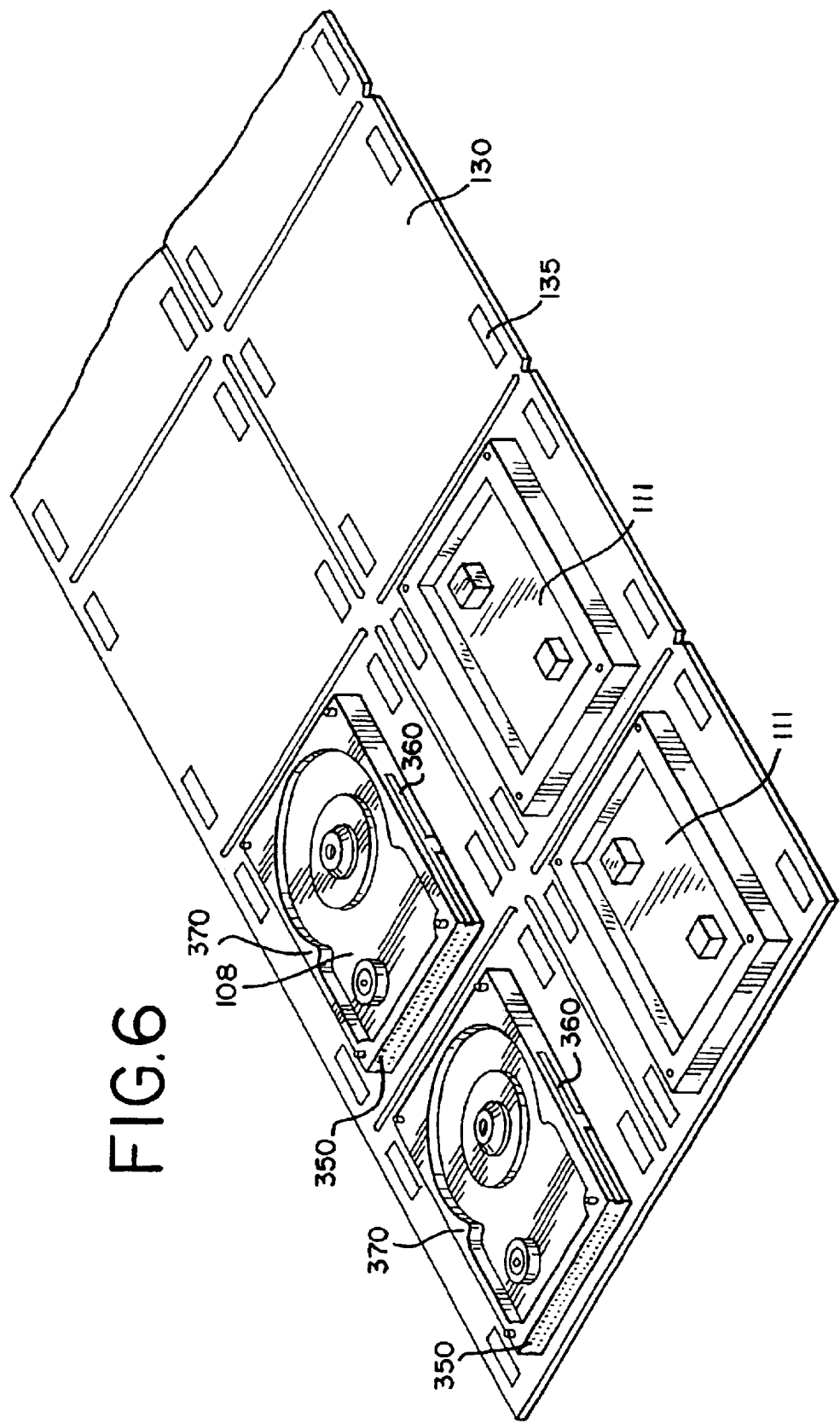
FIG. 6 is a perspective view of a metal strip with a base plate and cover made by an injection molding process of the present invention.

A preferred embodiment has the cover and base plate fabricated side by side during molding, as shown in FIG. 6. In this process a metal strip having both a base plate and a cover is placed in a two cavity mold. A monolithic body of phase change material is then injected onto the base plate and onto the cover to form lips, grooves, and other body features. After the strip is removed from the molding machine, and after the other internal components have been added to the drive, the cover is attached to the base plate using processes well known in the art, such as heat staking, sonic welding or glueing.

During encapsulation the base plate is placed in one half of the mold and is held in place by protrusions from the mold plate which extend through an aperture 135 in the base plate. The base plate 108, actuator assembly housing 310 and the stator 204 are aligned in position and the two halves are closed. Plastic is injected at a pre-determined pressure around the stator 204, actuator assembly housing 310 and base plate 108 so as to unitize those respective parts of the hard disc drive and form the body 250 shaped as shown in FIGS. 2 and 3. Likewise plastic can be molded around a circuit board or metal plate to form the HDD cover. After the pressure inside the mold reaches the pre-determined set point pressure, the phase change material is allowed to cool and solidify. This process is repeated sequentially for the rest of the base plates 108 if a metal strip 130 is employed.

Once the encapsulation process is complete, the other components of the actuator assembly and spindle motor assembly are assembled through conventional methods. In an alternative embodiment, it is also contemplated that the entire spindle motor assembly may be encapsulated with the actuator assembly being formed later or vice versa. It is also contemplated that the actuator assembly and the spindle motor assembly can be encapsulated with the base plate. Other variations are also contemplated wherein at least one or more of the non-moving parts of the hard disc drive are encapsulated with the base plate. In yet another embodiment, it is contemplated that a base plate is injection molded with a layer of phase change material to form various body features such as lips, flanges and grooves. These methods are described more fully in provisional U.S. patent application Ser. No. 60/171,817, filed Dec. 21, 1999, incorporated herein by reference.

In another preferred embodiment, the metal strip 130 has apertures 135 which are compatible with machines that are used for other manufacturing steps, so that the strip 130 acts as a carrier which can be used in various manufacturing steps. By acting as a carrier, it is meant that the metal strip 130 and the apertures 135 are configured in a manner such that the metal strip can be handled by machines, other than an injection molding machine, that are used in the manufacturing process of a hard disc drive. As a result, using the strip 130 with apertures 135 offers an easy way to manipulate small parts. Furthermore, it offers a way to ship the strips 130 to a customer for further assembly operations.

As illustrated in FIG. 6, the metal strip 130 having a base plate 108 and cover 111 may be fed continuously into an injection molding machine which would perform the injection molding step on each base plate and cover. The injection molding machine encapsulates hard disc drive components to the base plate and forms body features on the cover with a monolithic body of phase change material. The injection molding machine preferably performs these steps simultaneously, but it is also possible to perform them sequentially. One of ordinary skill in the art will appreciate that it is also possible to have an injection molding machine with multiple cavities so that several metal strips may be fed into the injection molding machine, thereby further increasing the efficiency of the process. After removing the metal strip from the mold, the cover may be separated from the strip or folded over and fixedly attached to the base plate.

Following the encapsulation technique in accordance with one embodiment of the invention a hard disc drive with a thickness between about two millimeters to about six millimeters may be manufactured. Preferably, in one embodiment, the disc drive would be about 3.3 millimeters thick, which corresponds with a miniature disc drive used to replace Type I flash memory devices. In another preferred embodiment, a thicker disc drive with a thickness of about 5 millimeters may also be manufactured that can be used to replace Type II flash memory devices.

Additionally, to reduce height and improve manufacturability, in one alternative embodiment, the cover 111 of the hard drive can be a printed circuit board. Using a circuit board as a cover obviates the necessity of having a separate cover. It is also contemplated that plastic may be injection molded around the edges of the cover so that the edges of the cover and the base plate 108 are made from the same material. In this manner the cover may also be fixed to the base plate by methods well known in the art, such as heat staking, sonic welding or gluing.

The present invention is also directed to a method of developing a miniature hard disc drive 10. In an exemplary embodiment, the hard disc drive includes a stator having conductors and the stator is substantially encapsulated in a body of phase change material. It has been found that using this basic design concept, high-speed motors can be developed and quickly optimized to meet various applications. There are several basic design parameters that can be varied when developing a motor according to the present invention: a) the composition (and thus characteristics) of the phase change material; b) the configuration of the body of phase change material; c) the magnetic design of the motor (the windings, core shape, etc.); d) the shape, size and configuration of the hub (and any discs used thereon when the motor is for a hard drive); and e) the shape, size and configuration of the actuator assembly.

In a first embodiment, where a miniature hard disc drive is developed, the method includes the following steps: a) providing an actuator assembly housing, a base plate, and a stator having multiple conductors that create a plurality of magnetic fields when electrical current is conducted through the conductors, the stator and actuator assembly housing being unitized with a base plate by substantially encapsulating with a body of first phase change material; b) mounting the disc and other components of the miniature hard disc drive through conventional means; c) energizing the actuator assembly and the spindle motor assembly in a manner that generates vibrations, and measuring the frequency of the vibrations; d) designing a second phase change material that dampens the vibrations generated by energizing the stator in step c); and e) repeating steps a)–c), substituting the second phase change material for the first phase change material. At least one of the flex modulus, elongation and surface hardness properties of the phase change material will be adjusted between the first and second phase change materials to optimize vibration dampening. The phase change material is preferably a thermoplastic. The advantages of this method of developing a hard disc drive is that the above-identified properties of the plastic may be adjusted to meet the vibration dampening needs of a variety of different motor types and configurations. The reduced vibration will improve motor performance and can reduce audible noise generation.

It is also possible to change the configuration of the body so that it will result in reduced harmonic oscillations and thus vibrations. In this embodiment, the method includes the steps of and a) providing an actuator assembly housing, a base plate, and a stator having multiple conductors that create a plurality of magnetic fields when electrical current is conducted through the conductors, the stator and actuator assembly housing being unitized with a base plate by substantially encapsulating with a body of first phase change material; b) mounting the disc and other components of the miniature hard disc drive through conventional means; c) energizing the actuator assembly and the spindle motor assembly in a manner that generates vibrations, and measuring the frequency of the vibrations; d) reconfiguring the shape of the phase change material to a second configuration and repeating steps a)–c), substituting the phase change material having the second configuration for the phase change material having the first configuration. In this embodiment, the configuration of the body of phase change material is adjusted to optimize vibration dampening. Of course, other dimensions of body components can also be used. In this aspect of the invention, reconfiguring the shape of the phase change material would also include adding such elements as a flange, grooves, etc., or even adopting a relatively different overall shape.

The present invention is also directed to an alternative method of developing a miniature hard disc drive. Like the other methods, this method also involves a high-speed motor that includes a body that is comprised of a phase change material that unitizes some components of a hard disc drive. The high-speed motor includes one or more, and generally a plurality of solid parts to be used in the motor either near or within the body, such as bearings and inserts. In addition, there are solid parts that are near the body, such as a disc support member and a hard disc drive base. The method of developing the high-speed motor comprises designing a phase change material to have a coefficient of linear thermal expansion such that the phase change material contracts and expands at approximately the same rate as the one or more solid parts. For example, the preferred phase change material should have a CLTE of between 70% and 130% of the CLTE of the core of the stator. The phase change material should have a CLTE that is intermediate the maximum and minimum CLTE of the solid parts where the body is in contact with different materials. Also, the CLTE's of the body and solid part(s) should match throughout the temperature range of the motor during its operation. An advantage of this method is that a more accurate tolerance may be achieved between the body and the solid parts because the CLTE of the body matches the CLTE of the solid parts more closely.

Most often the solid parts will be metal, and most frequently steel, copper and aluminum. The solid parts could also include ceramics. In almost all motors there will be metal bearings. Thus a common element of this aspect of the invention is developing a motor by designing the phase change material to have a CLTE approximately the same as that of the metal used to make the base plate 108.

Most thermoplastic materials have a relatively high CLTE. Some thermoplastic materials may have a CLTE at low temperatures that are similar to the CLTE of metal. However, at higher temperatures the CLTE does not match that of the metal. A preferred thermoplastic material will have a CLTE of less than $2 \times 10^{-5}$ in/in° F., more preferably less than $1.5 \times 10^{-5}$ in/in° F., throughout the expected operating temperature of the motor, and preferably throughout the range of 0° F. to 250° F. Most preferably, the CLTE will be between about $0.8 \times 10^{-5}$ in/in° F. and about $1.2 \times 10^{-5}$ in/in° F. throughout the range of 0° F. to 250° F. When the measured CLTE of a material depends on the direction of measurement, thickness of the sample, or conditions of molding, the relevant CLTE for purposes of defining the present invention is the CLTE of an encapsulated component in the direction in which the CLTE is lowest. Preferably, the CLTE in other directions is not more than 4 times the lowest value. The CLTE values are measured by a standard ASTM test method where the phase change material has the shape and form of the monolithic body that is overmolded on a component.

The CLTE of common solid parts used in a motor are as follows:

|  | 23° C. | 250° F. |
| --- | --- | --- |
| Steel | 0.5 | 0.8 ($\times 10^{-5}$ in/in/° F.) |
| Aluminum | 0.8 | 1.4 |
| Ceramic | 0.3 | 0.4 |

Of course, if the motor is designed with two or more different solids, such as steel and aluminum components, the CLTE of the phase change material would preferably be one that was intermediate, the maximum CLTE and the minimum CLTE of the different solids, such as 0.65 in/in/° F. at room temperature and $1.1 \times 10^{-5}$ in/in/° F. at 250° F.

One preferred thermoplastic material, Konduit OTF-212-11, was made into a thermoplastic body and tested for its coefficient of linear thermal expansion by a standard ASTM test method. It was found to have a CLTE in the range of −30 to 30° C. of $1.09 \times 10^{-5}$ in/in/° F. in the X direction and $1.26 \times 10^{-5}$ in/in/° F. in both the Y and Z directions, and a CLTE in the range of 100 to 240° C. of $1.28 \times 10^{-5}$ in/in/° F. in the X direction and $3.16 \times 10^{-5}$ in/in/° F. in both the Y and Z directions. (Hence, the relevant CLTEs for purposes of defining the invention are $1.09 \times 10^{-5}$ in/in/° F. and $1.28 \times 10^{-5}$ in/in/° F.) Another similar material, Konduit PDX-0-988, was found to have a CLTE in the range of −30 to 30° C. of $1.1 \times 10^{-5}$ in/in/° F. in the X direction and $1.46 \times 10^{-5}$ in/in/° F. in both the Y and Z directions, and a CLTE in the range of 100 to 240° C. of $1.16 \times 10^{-5}$ in/in/° F. in the X direction and $3.4 \times 10^{-5}$ in/in/° F. in both the Y and Z directions. By contrast, PPS type polymer, (Fortron 4665) was likewise tested. While it had a low CLTE in the range of −30 to 30° C. ($1.05 \times 10^{-5}$ in/in/° F. in the X direction and $1.33 \times 10^{-5}$ in/in/° F. in both the Y and Z directions), it had a much higher CLTE in the range of 100 to 240° C. ($1.94 \times 10^{-5}$ in/in/° F. in the X direction and $4.17 \times 10^{-5}$ in/in/° F. in both the Y and Z directions).

In addition to having a desirable CLTE, the preferred phase change material will also have a high thermal conductivity. A preferred thermoplastic material will have a thermal conductivity of at least 0.7 watts/meter° K. using ASTM test procedure 0149 and tested at room temperature (23° C.).

Hard disc drives with a body of phase change material substantially encapsulating the stator 204, the actuator assembly housing 310 and the base plate 108 wherein the phase change material has the CLTE or thermal conductivity as described above are themselves novel and define another aspect of the present invention. Once encapsulated, the hard disc drive will preferably be able to meet disc drive manufacturers' industry standards for extractable particles. Using laser particle counting, a cumulative average of particles greater than 0.5 micrometers in size will total less than ten thousand particles per milliliter. This is primarily because machined mounting plates are eliminated and other sources of particulates (steel laminations, wound wire and wire/terminal connections) are sealed in the encapsulation.

Also, the encapsulation reduces outgassing because varnish used to insulate wire in the windings and epoxy used to prevent steel laminations from oxidizing are hermetically sealed inside the stator assembly. Also, with fewer parts there is less glue needed to hold parts together. This reduced outgassing reduces the amount of material that could affect the magnetic media or heads used in the disc drive.

Another aspect of the invention utilizes the basic motor described above that has dampened vibrations to make a hard disc drive. The dampened vibrations can be either in the audible frequency range, thus resulting in a disc drive with less audible noise, or in other frequencies. As mentioned earlier, the degree to which data can be packed onto a hard drive is dependent on how close the data tracks are spaced. Due to reduced vibrations resulting from aspects of the present invention, the data tracks can be more closely spaced and the hard drive still operated.

The vibrations of concern are generally produced by harmonic oscillations. The phase change material can be selected so as to dampen oscillations at the harmonic frequency generated by operation of the motor, many of which are dependent on the configuration of the windings or other conductors. Thus, in one aspect, the invention is a motor and disc assembly wherein the motor comprises a stator having multiple conductors that create a plurality of magnetic fields when electrical current is conducted through the conductors and a monolithic body of phase change material substantially encapsulating the conductors. In this respect, the phase change material has a vibration dampening effect so that the motor and disc assembly has a reduction of harmonic oscillations.

There are a number of properties of the phase change material that can be varied in a way that will allow the phase change material to dampen different harmonic frequencies. This includes adding or varying the amount of glass, Kevlar, carbon or other fibers in the material; adding or varying the amount of ceramic filler in the material; changing the type of material, such as from polyphenyl sulfide to nylon or other liquid crystal polymers or aromatic polyesters, adding or grafting elastomers into a polymer used as the phase change material; and using a different molecular weight when the phase change material is a polymer. Any change that affects the flex modulus, elongation or surface hardness properties of the phase change material will also affect its vibration dampening characteristics.

One way to determine the effectiveness of vibration dampening, and thus to select a suitable material, is to make up motor configurations where different phase change materials are used, and then measure the vibration dampening accomplished by each material. The vibration dampening can be measured with a capacitance probe or laser Doppler vibrometer. In the audible range, 20–15,000 Hz, the dampening will preferably be at least 2, more preferably at least 5 decibels in reduction in harmonic frequency amplitude. These reductions are assessed based on a comparison of the vibrations of the same motor but without the stator being encapsulated.

The reduced vibrations thus allow for a unique hard disc drive with high data density and method of manufacturing the same. In this aspect of the invention, a hard disc drive is constructed with reduced vibration characteristics. The disc drive includes a stator assembly and an actuator assembly housing that are encapsulated with the base plate to form a unitized structure with good structural properties. The reduced vibration characteristic of the hard drive is taken advantage of by having close data tracks on the magnetic storage media. Preferably the data tracks are spaced so as to have at least 10,000 tracks/inch.

The vibration dampening ability of the phase change material may also be used in another aspect of the invention, a miniature hard disc drive having a high speed spindle motor with improved shock resistance. In this aspect of the invention, the body of phase change material is shock absorbing and thus minimizes the transfer of energy between the housing of a hard disc drive and the magnetic storage media.

Also, with reduced vibration, there will be less friction and wear in the bearings, which results in less heat being generated by the motor, in turn resulting in longer motor and bearing life and more power from the motor. Utilizing aspects of the present invention it is possible to construct motors able to spin in hard disc drives at speeds over 5,000 rpm. A preferred motor will be able to spin at 7,500 rpm or greater, and a more preferred embodiment will be able to spin at 10,000 rpm or greater.

A number of ways to improve thermal conductivity are presented. First, the phase change material will itself provide some heat dissipation. Second, the phase change material can include additives that will enhance its thermal conductivity. Third, the body of phase change material, by being in contact with a number of parts of the motor and/or disc drive, can act as a pathway for heat such that those other parts of the motor and/or disc drive can act as heat sinks. This improved thermal conductivity provides longer life to the electrical and bearing components of the motor, a higher power device, higher efficiency and lower current draw. If the motor is in a battery-powered device, this will extend the battery life.

Miniature hard disc drives built with the technique disclosed above will have better reliability from lower particulate levels and reduced outgassing. The hard drives will have improved shock resistance if the drive is dropped. The preferred motors and disc drives will have quieter operation.

Figure 5:
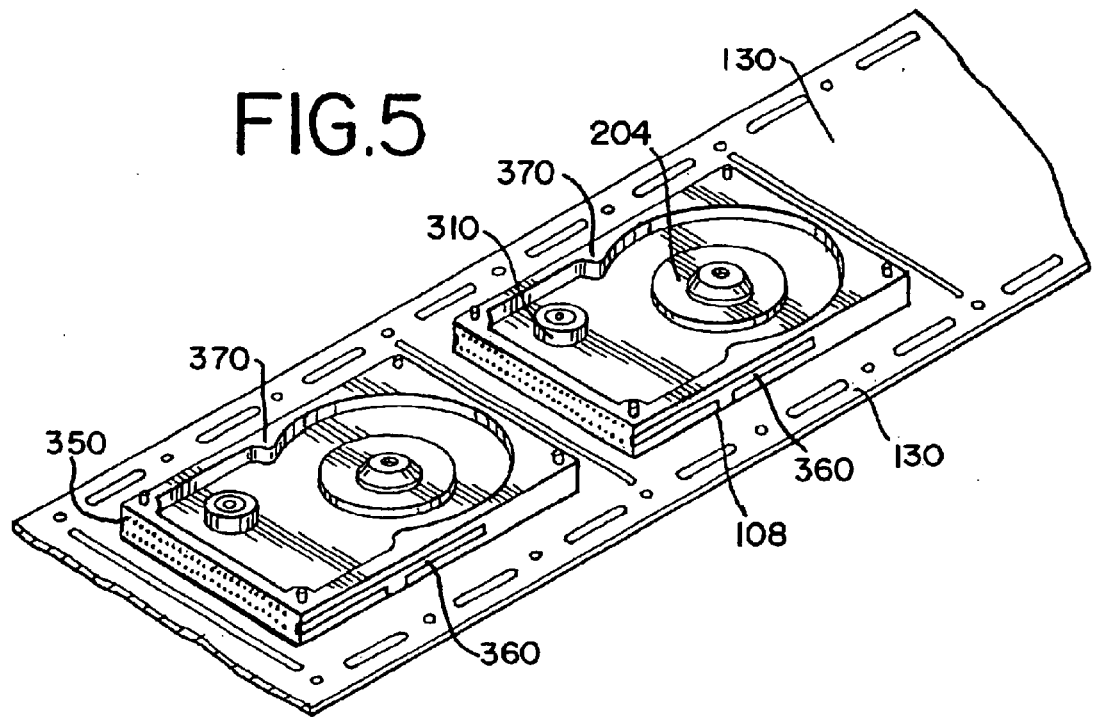
FIG. 5 is a perspective view of a metal strip with a base plate made by an injection molding process of the present invention.

The use of an encapsulated stator allows the terminal connectors 350 to be integrated into the body, as shown in FIGS. 3, 5 and 6. In general, the motor can be more easily assembled and will include fewer parts. As noted above, the stack-up tolerances are reduced because fewer components are used and the phase change material can be designed with a CLTE that closely approximates that of other motor components.

It is contemplated that numerous modifications may be made to the miniature hard disc drive and method for making the miniature hard disc drive of the present invention without departing from the spirit and scope of the invention as defined in the claims. For example, while the exemplary embodiment shown in the drawings has a body 250 that encapsulates the entire exposed top surface of base plate 108, it is conceivable that the body only encapsulates a portion of the top surface of the base plate so that the stator 204 and actuator assembly housing 310 are unitized to the base plate 108. Furthermore, body 250 may also encapsulate connector pins that are inserted through the base plate 108 without departing from the scope of the invention. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

What is claimed is:

1. A method of manufacturing base plates for miniature hard disc drives comprising:
    a) providing a metal strip to be formed into a plurality of base plates; and
    b) feeding the metal strip continuously through an injection molding machine to sequentially injection mold a monolithic body layer of phase change material on one or more surfaces of the metal strip to form said plurality of base plates for miniature hard disc drives, wherein said monolithic body forms body features on each base plate.

2. The method of claim 1 wherein the phase change material comprises a material that changes form a liquid to a solid due to a change in temperature.

3. The method of claim 1 wherein the phase change material changes from a liquid to a solid due to a chemical reaction.

4. The method of claim 1 wherein the phase change material comprises a thermosetting material or a thermoplastic material.

5. The method of claim 1 wherein the phase change material includes ceramic particles.

6. The method of claim 1 wherein the phase change material has a coefficient of linear thermal expansion of less than $2 \times 10^{-5}$ in/in/° F. throughout the range of 0–250° F.

7. The method of claim 1 wherein the phase change material has a coefficient of linear thermal expansion of less than $1.5 \times 10^{-5}$ in/in/° F. throughout the range of 0–250° F.

8. The method claim 1 wherein the phase change material has a coefficient of linear thermal expansion of between about $0.8 \times 10^{-5}$ in/in/° F. and about $1.3 \times 10^{-5}$ in/in/° F. throughout the range of 0–250° F.

9. The method of claim 1 wherein the phase change material has a thermal conductivity of at least 0.7 watts/meter° K. at 23° C.

10. The method of claim 1 wherein the phase change material has a dielectric strength of at least 250 volts/mil.

11. The method of claim 1 wherein the phase change material has a coefficient of linear thermal expansion in the X, Y and Z directions, wherein the coefficient of linear thermal expansion is lowest in the X direction, and wherein the coefficient of linear thermal expansion in the Y and Z directions is no more than four times the coefficient of linear thermal expansion in the X direction.

12. The method of claim 1 wherein the body features comprise flanges, lips, grooves and connectors.

13. The method of claim 1 wherein the metal strip is used as a carrier.

14. The method of claim 1 wherein the metal strip has apertures which are configured in a manner such that the metal strip can be handled by a machine, other than an injection molding machine, that is used in a manufacturing process of a hard disc drive.

15. The method of claim 1 wherein the body features on each base plate include sidewalls, and each sidewall includes a longitudinal groove in the outside surface of the sidewall.

16. The method of claim 1 wherein the body features on each base plate including sidewalls, and each sidewall includes a longitudinal groove in the outside surface of the sidewall configured such that hard disc drives made from the base plates are compatible with devices using Type I Flash memory devices.

17. The method of claim 1 wherein the body features on each base plate including sidewalls, and each sidewall includes a longitudinal groove in the outside surface of the sidewall configured such that hard disc drives made from the base plates are compatible with devices using Type II Flash memory devices.

18. A method of manufacturing base plates for miniature hard disc drives comprising:
   a) providing a metal strip to be formed into a plurality of base plates; and
   b) feeding the metal strip through an injection molding machine to injection mold a monolithic body layer of phase change material on one or more surfaces of the metal strip to form said plurality of base plates for miniature hard disc drives, wherein said monolithic body forms body features on each base plate, each base plate being generally rectangular and the body features on each base plate including sidewalls along at least two opposite sides of the base plate.

19. The method of claim 18 wherein the base plate has extractable particles greater than 0.5 micrometers in size of less than ten thousand particles per milliliter.

20. The method of claim 18 wherein each sidewall includes a longitudinal groove in the outside surface of the sidewall configured such that hard disc drives made from the base plates are compatible with devices using Type I Flash memory devices.

21. The method of claim 18 wherein each sidewall includes a longitudinal groove in the outside surface of the sidewall configured such that hard disc drives made from the base plates are compatible with devices using Type II Flash memory devices.

22. The method of claim 18 wherein the metal strip has apertures which are configured in a manner such the metal strip can be handled by a machine, other than an injection molding machine, that is used in a manufacturing process of a hard disc drive.

* * * * *